US005503649A

United States Patent [19]

Nickel

[11] Patent Number: 5,503,649

[45] Date of Patent: Apr. 2, 1996

[54] AIR FILTER FOR AN INTERNAL COMBUSTION ENGINE

[75] Inventor: Hans Nickel, Cottenweiler, Germany

[73] Assignee: Andreas Stihl, Waiblingen, Germany

[21] Appl. No.: 398,116

[22] Filed: Mar. 3, 1995

[30] Foreign Application Priority Data

Mar. 4, 1994 [DE] Germany .......................... 44 07 124.8

[51] Int. Cl.$^6$ .................................................... B01D 45/08

[52] U.S. Cl. ................................ 55/321; 55/327; 55/444; 55/462; 55/DIG. 28; 123/198 E

[58] Field of Search .................................. 55/385.3, 462, 55/442, 443, 444, 320–322, 327, DIG. 28; 123/198 E

[56] References Cited

U.S. PATENT DOCUMENTS

| | | | |
|---|---|---|---|
| 1,447,160 | 2/1923 | Thompson | 55/DIG. 28 |
| 1,678,044 | 7/1928 | Hewitt et al. | 55/DIG. 28 |
| 3,057,335 | 10/1962 | Osborne | 55/DIG. 28 |
| 3,740,932 | 6/1973 | Borsheim | 55/DIG. 28 |
| 3,792,573 | 2/1974 | Borsheim | 55/DIG. 28 |
| 4,600,418 | 7/1986 | Gommel et al. | 55/462 |
| 4,834,784 | 5/1989 | Bidanset | 55/DIG. 28 |

FOREIGN PATENT DOCUMENTS

| | | | |
|---|---|---|---|
| 712542 | 7/1954 | United Kingdom | 55/DIG. 28 |

*Primary Examiner*—Richard L. Chiesa
*Attorney, Agent, or Firm*—Robert W. Becker & Associates

[57] ABSTRACT

An air filter for an internal combustion engine has a housing with an interior chamber. The housing has housing walls at least one of which is in the form of a filter element. One of the housing walls has a suction opening for connecting the air filter to a suction channel of the combustion engine, wherein combustion air flows through the filter element into the interior chamber and from the interior chamber through the suction opening into the combustion engine. Air flow resistance elements are arranged in the interior chamber upstream of the suction opening. The air flow resistance elements are arranged in a first and a second row. The first and second rows are spaced apart from one another in the direction of flow of the combustion air. The air flow resistance elements of the first row of the second row are spaced laterally from one another to form gaps therebetween. The air flow resistance elements of the first row are positioned so as to be substantially aligned with the gaps of the second row.

19 Claims, 5 Drawing Sheets

AIR FILTER FOR AN INTERNAL COMBUSTION ENGINE

BACKGROUND OF THE INVENTION

The present invention relates To an air filter for an internal combustion engine, especially for a two-stroke engine for hand-held working tools such as motor chainsaws, a cutter or trimmer etc. The air filter is comprised of a housing with housing walls formed by filter elements through which the combustion air is sucked into the interior chamber of the housing. A suction opening is provided in one of the housing walls for connecting the air filter to the suction channel of the combustion engine.

In internal combustion engines, especially in two-stroke combustion engines, gas pulsations occur within the suction channel which, due to the design and operation of the combustion engine, cannot be avoided. Due to these pulsations, a portion of the combustion air enriched with fuel, and in the case of two-stroke combustion engines also with oil, flows counter to the suction direction back into the air filter. The fuel and/or the oil are deposited on the filter surfaces so that the wet filter surface is soiled and will subsequently be clogged. Thus, frequent filter changes are required.

In order to minimize the escape of suction air flow into the air filter, it is suggested according to U.S. Pat. No. 4,600,418 to embody the surface of the air filter facing the suction channel as a rebound wall with a curvature such that the pulsating gas flow is deflected in the direction toward the suction channel in the direction of flow of suction air. With such a measure it is indeed possible to reduce the danger of wetting and soiling of the air filter. However, the resulting service life of such air filters cannot be increased to the extent desired.

It is therefore an object of the present invention to provide an air filter of the aforementioned kind with which a wetting of the filter element by backwashing of the fuel/air mixture is prevented.

SUMMARY OF THE INVENTION

An air filter for an internal combustion engine according to the present invention is primarily characterized by:

A housing having an interior chamber;

The housing comprising housing wall at least one of which is in the form of a filter element;

One of the housing walls having a suction opening for connecting the air filter to a suction channel of the combustion engine, wherein combustion air flows through the filter element into the interior chamber and from the interior chamber through the suction opening into the combustion engine;

Air flow resistance elements arranged in the interior chamber upstream of the suction opening, the air flow resistance elements arranged in a first and a second row;

The first and second rows spaced apart from another in the direction of flow of the combustion air;

The air flow resistance elements of the first rows spaced laterally from one another to form gaps therebetween and the air flow resistance elements of the second row are spaced laterally from one another to form gaps therebetween; and The air flow resistance elements of the first row positioned so as to be substantially aligned with the gaps of the second row.

Advantageously, the space between the first and second rows has a volume substantially equal to a pulsation volume of the internal combustion engine.

The air flow resistance elements are preferably positioned substantially parallel to the central axis of the suction opening.

The first and the second rows are positioned substantially in an annular arrangement about the central axis of the suction opening. The first and the second rows are arranged substantially concentrically relative to one another.

Expediently, the air flow resistance elements have the shape of ring segments.

Preferably, the air flow resistance elements are substantially U-shaped with legs pointing toward the suction opening. Preferably, the air flow resistance element of the first row, aligned with one of the gaps between two adjacent ones of the air flow resistance elements of the second row, is positioned such that each one of the legs of the air flow resistance element of the first row and the leg of the two air flow resistance elements of the second row adjacent to the gap are respectively positioned on a radial line extending from the suction opening. Preferably, the free ends of the legs are tapered.

In a preferred embodiment of the present invention the air flow resistance elements project into the interior chamber.

Advantageously, the air flow resistance elements extend from the first housing wall at which said suction opening is provided to the oppositely arranged housing wall.

Advantageously, the air filter of the present invention further comprises an insert positioned at the suction opening opposite the air flow resistance elements, whereby the insert is comprised of an absorbent material and serves as a reservoir. The absorbent material is preferably a foamed rubber or foamed plastic material. Advantageously, the body extends along the entire height of the airflow resistance elements.

Expediently, the air filter further comprises a body made of absorbent material, the body resting on the insert and extending in a direction of the height of the air flow resistance elements. Preferably, the body is positioned within the area delimited by the first row of the air flow resistance elements. Preferably, the body is arranged substantially perpendicular to the central axis of the suction opening.

In yet another embodiment of the present invention the housing is comprised of two half shells wherein the air flow resistance elements and one of the half shells are formed as a unitary part. Advantageously, the half shell that comprises the air flow resistance elements also comprises the suction opening.

With the staggered arrangement of at least two rows of air flow resistance elements a direct flow path from the suction opening back into the interior chamber of the air filter is interrupted. The combustion air flowing through the interior chamber to the suction opening encounters a low-resistance flow path due to the design of the air flow resistance elements and their staggered arrangement with elements of one row being positioned so as to be aligned with gaps of the other row. However, a gas flow backwashing from the suction opening into the interior chamber of the air filter encounters a great flow resistance. This great flow resistance results in turbulence so that fuel and oil contained in the gas mixture will be deposited on the air flow resistance elements. Thus, portions of the backwashing gas flow which in the most unfavorable situation could enter the area of the interior chamber beyond the air flow resistance elements have a very low contents of fuel and/or oil.

Preferably, it is suggested that the space between the rows of the air flow resistance elements has a volume that corresponds to the gas pulsation volume of the combustion engine connected to the air filter so that the backwashing gas flow is caught in the buffer volume between the rows of the air flow resistance elements. Preferably, the air flow resistance elements are substantially positioned parallel to the axis of the suction opening, i.e., they extend essentially perpendicular to a plane in which the suction opening is located. In a preferred embodiment of the invention the rows of air flow resistance elements are essentially arranged as rings (annular arrangement) about the axis of the suction opening.

The air flow resistance elements in a preferred embodiment are U-shaped whereby the legs point toward the interior of the rings. In this arrangement, one leg of an air flow resistance element of one row and the leg of a neighboring air flow resistance element of the other row can be positioned on a common radial line. In order to favor entraining fuel and oil deposited on the air flow resistance elements by the suction stream of combustion air, the free ends of the legs are preferably tapered.

In a preferred embodiment of the invention an insert of an absorbent material such as foamed rubber or foamed plastic is arranged within the area opposite the air flow resistance elements at the suction opening. This insert serves as a reservoir for collecting fuel and oil deposited on the air flow resistance elements. In order to aid their return into the suction air stream, it is suggested to provide a body made of an absorbent material such as foamed rubber etc. which extends substantially in the direction of the height of the air flow resistance element, preferably in the area of the inner row. This arrangement provides for a side surface of the body facing the suction openings so that combustion air exiting from the interior chamber through the suction opening passes along the side of the reservoir body and absorbs and returns fuel and oil.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 5.

Figure 4:
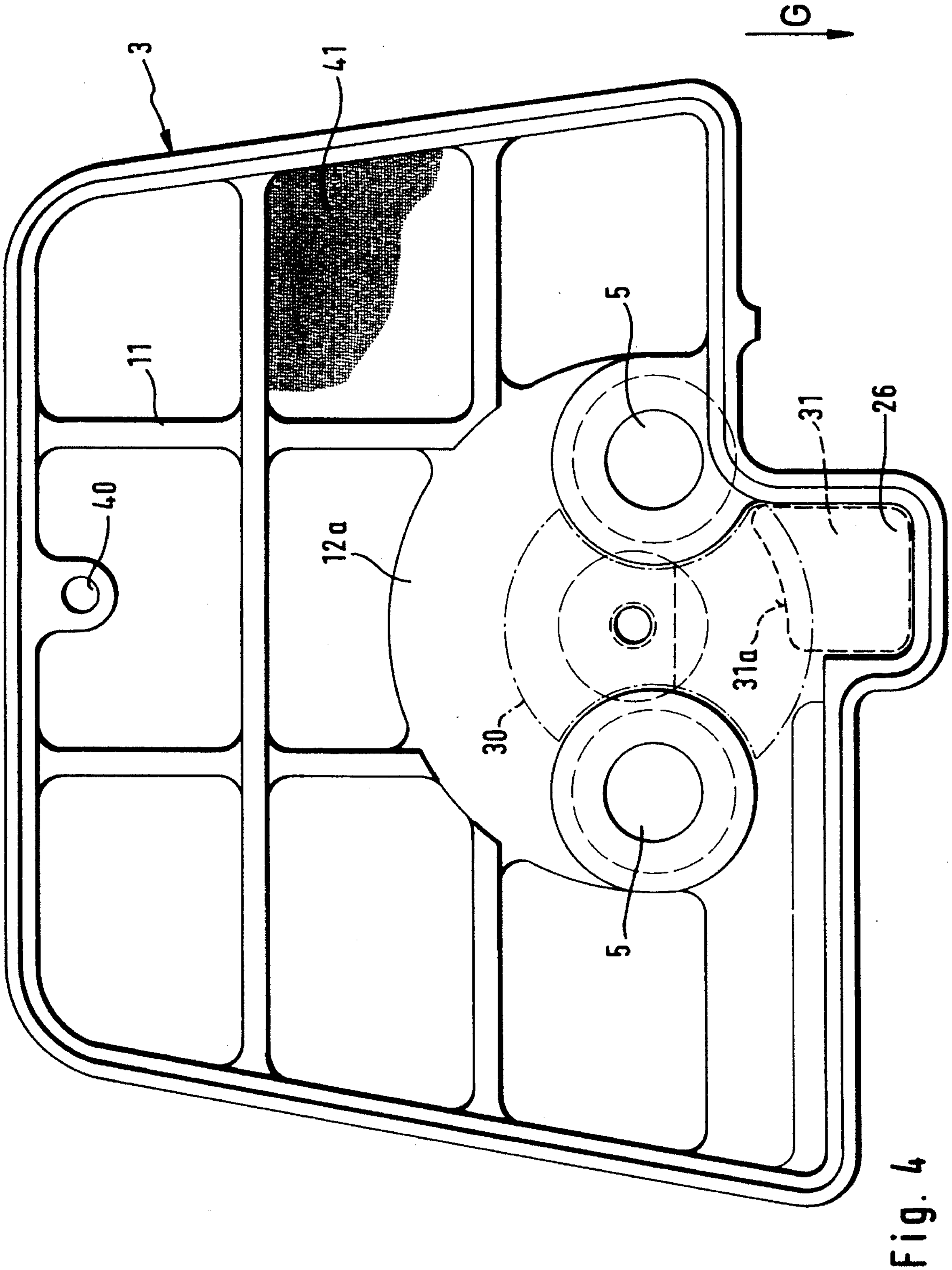
FIG. 4 shows a plan view of a second housing half shell of the air filter.
Figure 5:
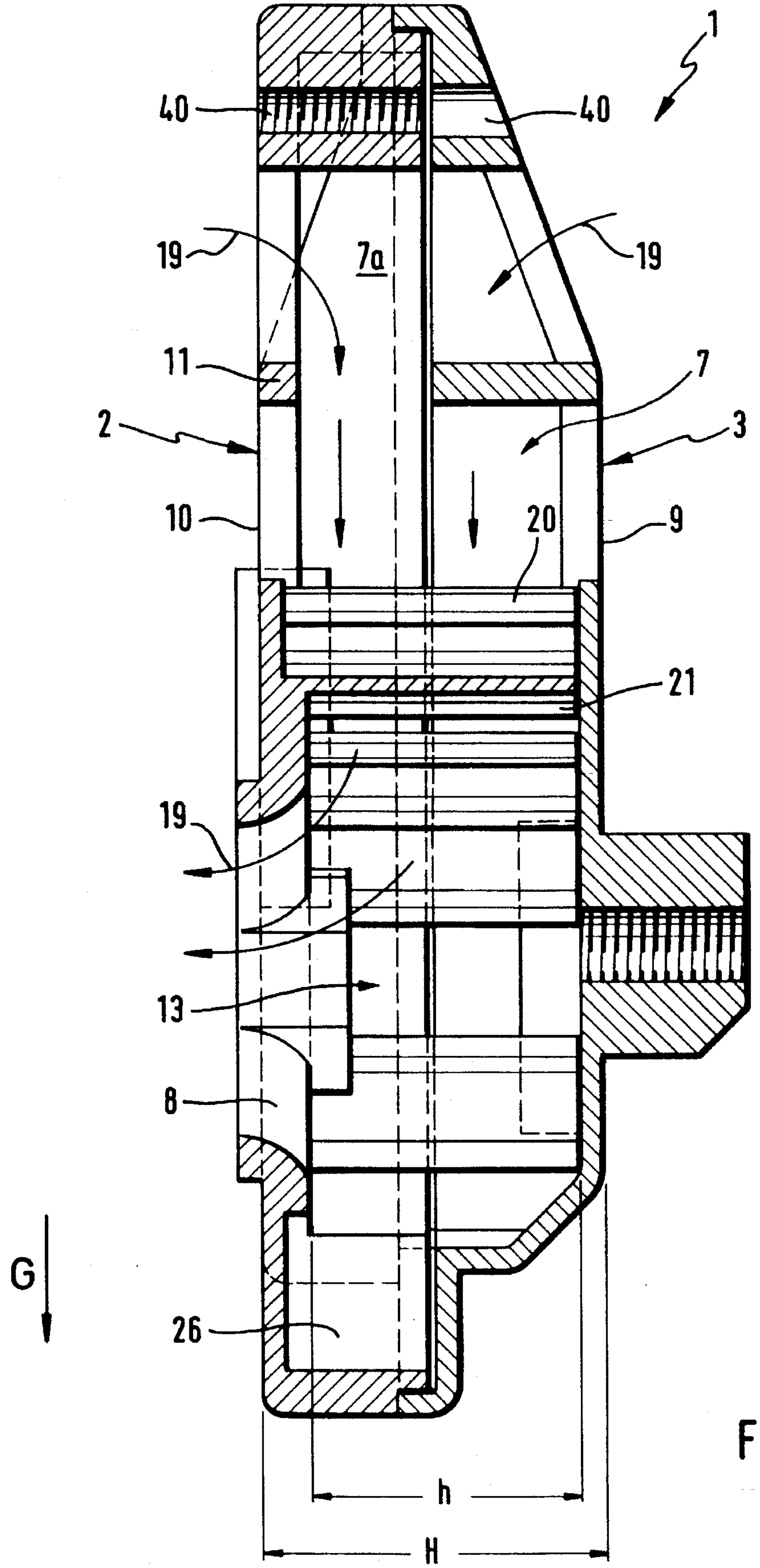
FIG. 5 shows a section of the air filter comprised of the half shells of FIGS. 1 and 4.

The air filter 1 of the inventive embodiment shown in FIG. 5 is comprised of two housing parts 2, 3, preferably in the form of half shells. The assembled housing half shells are connected with screws that are received in receiving openings 4 (FIG. 2) within the housing half shell 2 and aligned receiving openings 5 (FIG. 4) in the other housing half shell 3. One such screw 6 is represented in a dashed line in FIG. 2. At the edge of the filter housing a further throughbore 40 can be provided for arranging a further fastening screw (FIG. 5).

The assembled housing half shells 2 and 3 delimit an interior chamber 7 that defines the clean room of the air filter and which is provided with a suction opening 8 (FIG. 1, FIG. 5) which is provided in the housing wall 10 of the half shell 2. The housing of the air filter 1 has a small height H forming a peripheral narrow edge. The oppositely arranged housing walls 9, 10 of a great surface area are in plan view slightly trapezoidal (FIG. 1, FIG. 4) whereby the housing walls 9 and 10 are in the form of a grate with the exception of the area 12 in which the suction opening 8 is provided. The grate serves as a support 11 for a filter element (mesh) 41. Preferably, the housing parts 2, 3 of the air filter 1 are made of plastic whereby the filter element (mesh) 41 can be embodied as an unitary part together with the support 11.

The wall section 12 in which the suction opening 8 is provided is of a semi-circular shape whereby a corresponding continuous wall section 12*a* is provided at the opposite housing half shell 3.

Figure 1:
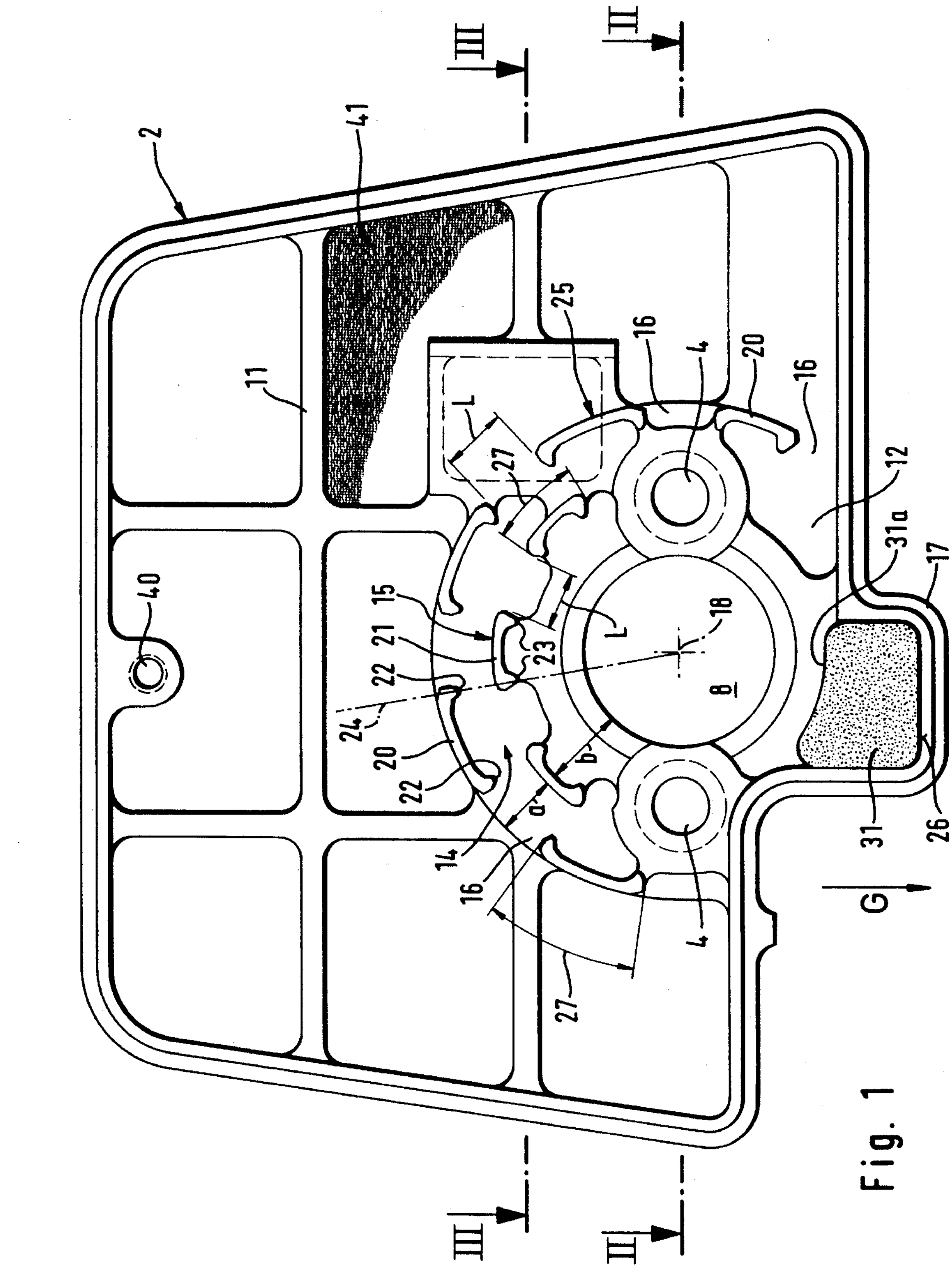
FIG. 1 shows a plan view of a first housing half shell of a filter housing.
Figure 2:
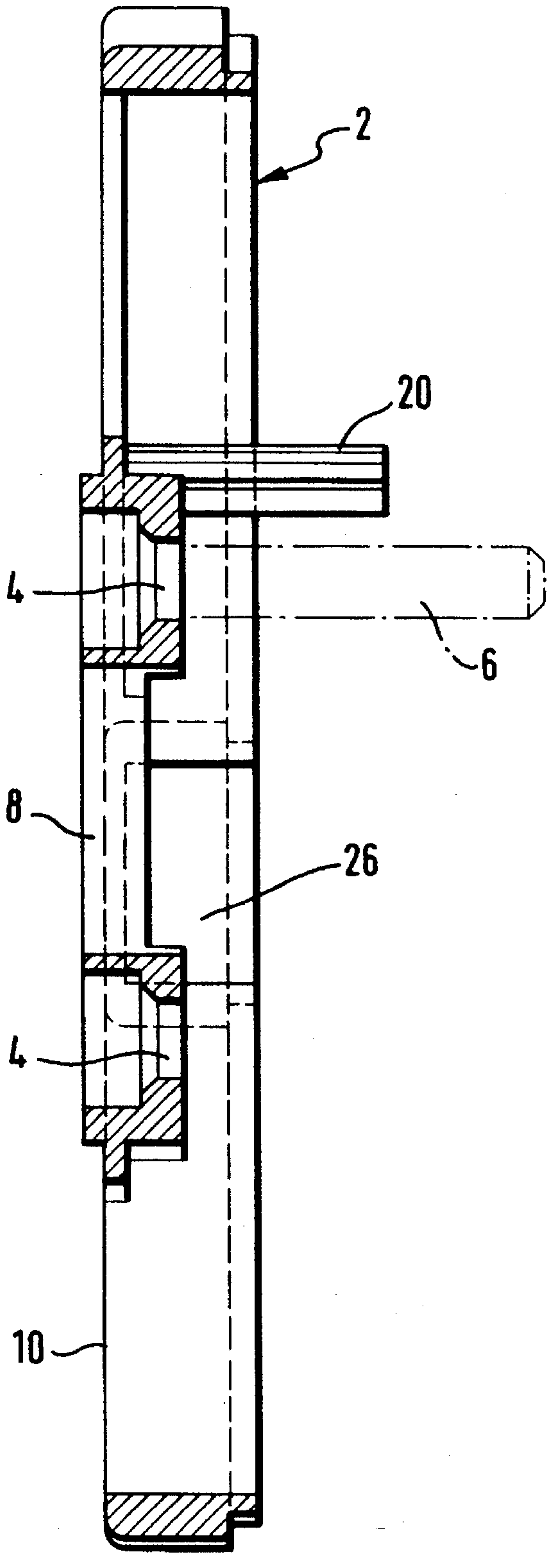
FIG. 2 shows a section along the line II—II of FIG. 1.
Figure 3:
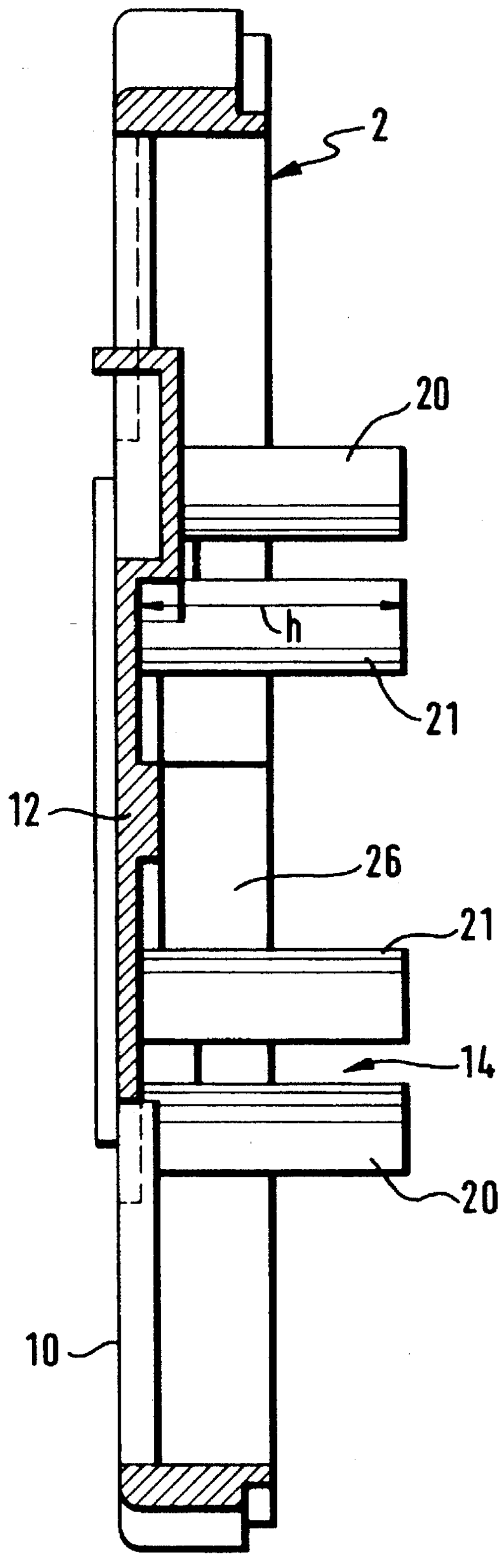
FIG. 3 shows a section along the line III—III of FIG. 1.

In the plan view according to FIG. 1 it can be seen that the suction opening 8 is preferably surrounded by two rows 15, 25 of air flow resistance elements 20, 21 which relative to the axis 18 of the suction opening 8 are positioned at a radial distance a from one another. It is also possible to provide three or more rows of such air flow resistance elements in the shown staggered arrangements. The rows 15, 25 are essentially arranged in the form of a ring about the axis 18 of the suction opening 8 whereby the rows 15, 25 are preferably concentric to one another. The distance b of the inner row 15 to the edge of the suction opening 8 is selected to be greater than the radial distance a between the inner row 15 and the outer row 25.

As shown in FIG. 5, the air flow resistance elements 20, 21 project from the housing wall 10, extend toward the other housing wall 9, and rest at the wall section 12*a*. The housing edge of the air filter in the area of the suction opening 8, the inner row 15, and the wall section 12*a* of the housing half shell 3 form a suction ante room 13 which is connected via the suction opening 8 directly to the suction channel of a combustion engine, especially of a two-stroke combustion engine. The space delimited by the inner row 15 and the outer row 25 as well as by the wall section 12 of the housing half shell 2 and the wall section 12*a* of the housing half shell 3 forms a buffer volume 14 for backwashing gas flow, as will be described in the following.

As can be seen especially in FIG. 1, each air flow resistance element 20, 21 is preferably shaped as a ring segment whereby neighboring air flow resistance elements 20, 21 of each row 15, 25 are spaced from one another by a lateral distance L. Preferably, the distance L of neighboring air flow resistance elements 20 in the outer row 25 is identical to the distance L of neighboring air flow resistance elements 21 of the inner row 15. The air flow resistance elements 21 of the inner row 15 are positioned such, relative to a radial line of the axis 18 of the suction opening 8, that they essentially cover the gaps 16 formed by spacing the air flow resistance elements 20 at the distance L. Preferably, the air flow resistance element 20, 21 are slightly wider than the gaps 16 to be covered in the flow direction of the combustion air. Due to the concentric arrangement of the rows 15, 25 relative to one another and the arrangement of the air flow resistance elements 20, 21 on the respective circular arc, the center point of which is preferably the axis 18 of the suction opening 8, the circular arc section of a gap 16 is thus smaller than the circular arc section of the air flow resistance element 20, 21 covering this gap 16. Preferably, the air flow resistance elements 20, 21 of one row 15, 25 are embodied identical to one another and are positioned adjacent to one another with an equidistant spacing L.

In the shown embodiment the air flow resistance elements 20, 21 are substantially U-shaped whereby the legs 22 are pointing toward the suction opening 8, i.e., they are pointing towards the inner area of the ring or circular arc. Preferably, the corresponding legs 22 of an air flow resistance element 20 of the outer row 25 are arranged such relative to a neighboring leg 23 of an air flow resistance element 21 of the inner row 15 that the legs 22 and 23 are positioned on a common radial line 24 to the axis 18 of the suction opening 8. It may be expedient to provide the free ends of the legs so as to be tapered.

When assembled, the incoming air (see arrow 19) must change its course twice on its way to the suction opening 8 due to the construction of the air filter 1 whereby the combustion air flowing radially through the gaps 16 of the outer row 25 into the buffer volume 14 flows about the inner air flow resistance elements 21 and through their gaps 16 into the suction ante chamber in order to be guided via the suction opening 8 to the combustion engine. The backwashing or back pulsation of combustion air enriched with fuel and oil, which occurs in combustion engines and especially in two-stroke combustion engines, is favorably affected by the inventive construction of the air filter 1. The U-shaped air flow resistance elements 21 facing the suction opening 8 represent a considerable flow resistance for a flow from the suction ante chamber 13 into the clean room 7a of the air filter whereby due to the shape of the air flow resistance elements 21 great turbulence is produced that effects that the fuel and/or oil are deposited on the air flow resistance elements 20, 21. Preferably, it is furthermore suggested that the buffer volume 14 between the rows 15 and 21 of the air flow resistance elements 20 and 21 is to be adjusted in volume to the pulsation volume of the combustion engine so that a backwashing gas flow ideally is trapped within the buffer volume 14. In a subsequent suction stroke the gas flow caught within the buffer volume 14 is then washed out by the flow of fresh combustion air flowing through the clean room 7a and ante chamber 13 into the suction opening 8 so that the buffer volume 14 is again freed of air laden with fuel and/or oil. The oil, respectively, the fuel that has been deposited on the air flow resistance elements 20 and 21 is entrained during the suction stroke by the combustion air flowing in the direction of arrow 19. For enhancing entrainment the legs 22 and 23 of the air flow resistance elements 20, 21 are preferably tapered.

In FIG. 1 the inner row 15 is comprised of only three air flow resistance elements 21, while the outer row is comprised of five air flow resistances elements 20. In the area of the inner row 15 fastening screws 6 are guided through the receiving openings 4 so that the fastening screws 6 themselves form air flow resistance elements which cover a corresponding gap 16 of the outer row 25 of the air resistance elements 20.

This staggered arrangement of at least two rows 15, 25 of air flow resistance elements effects a retention of the backwashing gas flow whereby simultaneously, due to the shape of the air resistance elements, a deposition of fuel and oil is favored. In the direction of flow 19 of the combustion air, on the other hand, the air flow resistance elements 20 are flow-dynamically designed so that for the combustion air flowing toward the suction opening 8 no great flow resistance is present. The suction resistance of the air filter is not increased. Due to the concentric arrangement of the air flow resistance elements 20, 21 and the gaps 16 of substantially the same width within the inner or the outer ring 15, 25, the air flow resistance elements 20 of the outer row 25 can be of the same size, relative to the segment angle, as the air flow resistance elements 20 of the inner row 15. The segment angle 27 is preferably substantially 30°.

Figure 5A:
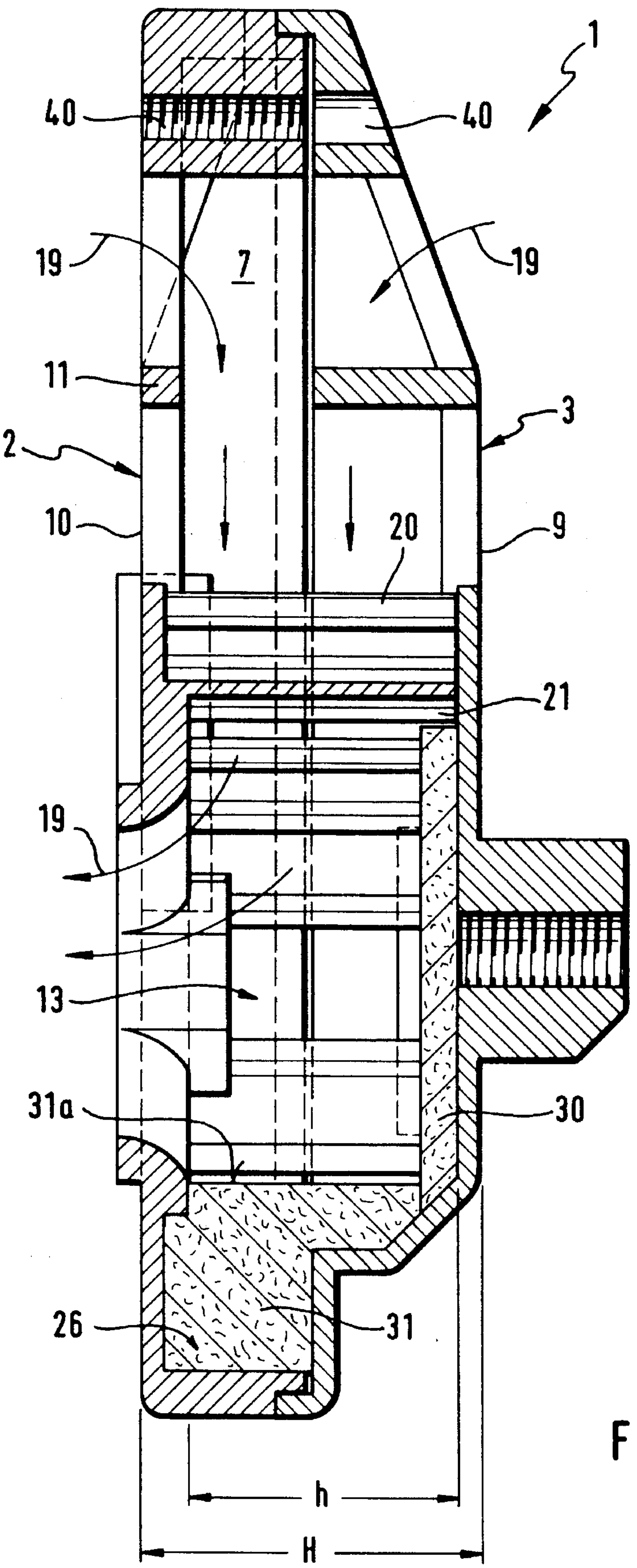
FIG. 5*a* shows schematically the position of the body and insert within the air filter in a view corresponding to FIG. 5.

In a further embodiment of the invention the wall section 12a of the second half shell 3 receives a body 30 made of liquid-absorbent materials such as foamed rubber or foamed plastic etc. as is shown in dashed lines in FIG. 4 (see also FIG. 5a for its position within the filter). This body 30 extends essentially perpendicular to the axis 18 of the suction opening 8. This absorbent body 30 ensures that droplets forming at the bottom area of the air flow resistance elements 20, 21 can be captured, stored and released in a subsequent suction stroke by the incoming combustion air, indicated by arrow 19.

The shown air filter 1 is mostly used such that the gravitational force acts in the direction of arrow G. This, over an extended operational period could lead to the collection of liquid in form of a fuel/oil mixture at the lower edge 17 of the housing. In the area of the edge 17 a receiving chamber 26 is provided within the housing half shell 2 as well as within the housing half shell 3 for a reservoir body (insert) 31 (indicated in dashed lines in FIG. 4). This insert 31 is preferably made of foamed rubber or plastic and is essentially in the shape of a parallelepiped that is pressed into the receiving chamber 26 and conforms to the shape of the chamber 26. The upper part with surface 31a extends in the direction of the height of the air flow resistance elements 20, 21. The reservoir insert 31 preferably extends over the entire height h of the air flow resistance elements 20, 21 from one housing wall 10 to the other housing wall 9. The surface 31a of the reservoir body 31 which is facing the suction opening 8 is positioned substantially at the level of the inner ring 15 so that it is ensured that this surface 31a over its entire length is subjected to the stream of outflowing combustion air leaving through the suction opening 8 so that the reservoir body 31 can release fuel and oil.

FIG. 5a shows schematically the relative arrangement of body 30 and insert 31 within the air filter 1 (the hatching of the two parts 30, 31 is only used to better illustrate the parts within the filter and is not to be understood to represent a metal). This shown embodiment represents a non-limiting example of the arrangement of the body and insert. Other arrangements will be apparent to a person skilled in the art.

The present invention is, of course, in no way restricted to the specific disclosure of the specification and drawings, but also encompasses any modifications within the scope of the appended claims.

What I claim is:

1. An air filter for an internal combustion engine, said air filter comprising:

a housing having an interior chamber;

said housing comprising housing walls at least one of which is in the form of a filter element;

one of said housing walls having a suction opening for connecting said air filter to a suction channel of the combustion engine, wherein combustion air flows through said filter element into said interior chamber and from said interior chamber through said suction opening into the combustion engine;

air flow resistance elements arranged in said interior chamber upstream of said suction opening, said air flow resistance elements arranged in a first and a second row;

said first and said second rows spaced apart from one another in the direction of flow of the combustion air;

said air flow resistance elements of said first row spaced laterally from one another to form gaps therebetween and said air flow resistance elements of said second row spaced laterally from one another to from gaps therebetween; and said air flow resistance elements of said first row positioned so as to be substantially aligned with said gaps of said second row.

2. An air filter according to claim 1, wherein a space between said first and said second rows has a volume substantially equal to a pulsation volume of the internal combustion engine.

3. An air filter according to claim 1, wherein said air flow resistance elements are positioned substantially parallel to the central axis of said suction opening.

4. An air filter according to claim 1, wherein said first and said second rows are positioned substantially in an annular arrangement about the central axis of said suction opening.

5. An air filter according to claim 4, wherein said first and said second rows are arranged substantially concentrically relative to one another.

6. An air filter according to claim 1, wherein said air flow resistance elements have the shape of ring segments.

7. An air filter according to claim 1, wherein said air flow resistance elements are substantially U-shaped with legs pointing toward said suction opening.

8. An air filter according to claim 7, wherein said air flow resistance element of said first row, aligned with one of said gaps between two adjacent ones of said air flow resistance elements of said second row, is positioned such that each one of said legs of said air flow resistance element of said first row and said leg of said two air flow resistance elements of said second row adjacent to said gap are positioned on a radial line extending from said suction opening, respectively.

9. An air filter according to claim 8, wherein free ends of said legs are tapered.

10. An air filter according to claim 1, wherein said air flow resistance elements project into said interior chamber.

11. An air filter according to claim 10, wherein said air flow resistance elements extend from said housing wall at which said suction opening is provided to an oppositely arranged one of said housing walls.

12. An air filter according to claim 1, further comprising an insert positioned at said suction opening opposite said air flow resistance elements, said insert being comprised of an absorbent material and serving as a reservoir.

13. An air filter according to claim 12, wherein said absorbent material is selected from the group consisting of foamed rubber and foamed plastic.

14. An air filter according to claim 12, wherein said insert extends along the entire height of said air flow resistance elements.

15. An air filter according to claim 12, further comprising a body made of absorbent material, said body resting at said insert and extending in a direction of the height of said air flow resistance elements.

16. An air filter according to claim 15, wherein said body is positioned within an area delimited by said first row of said air flow resistance elements.

17. An air filter according to claim 15, wherein said body is arranged substantially perpendicular to the central axis of said suction opening.

18. An air filter according to claim 1, wherein said housing is comprised of two half shells and wherein said air flow resistance elements and one of said half shells are formed as a unitary part.

19. An air filter according to claim 18, wherein said one half shell comprising said air flow resistance elements also comprises said suction opening.

* * * * *